United States Patent Office 3,700,595
Patented Oct. 24, 1972

3,700,595
FERROFLUID COMPOSITION
Robert Kaiser, Cambridge, Mass., assignor to Avco Corporation, Cincinnati, Ohio
No Drawing. Filed June 15, 1970, Ser. No. 46,556
Int. Cl. H01f 1/10
U.S. Cl. 252—62.56    7 Claims

ABSTRACT OF THE DISCLOSURE

The present invention relates to a ferrofluid composition usable to control oil spills floating on open bodies of water. Such a process involves dispersing the present hydrocarbon base ferrofluid into the oil slick, then using a magnetic field to attract and pick up the oil. The same ferrofluid composition is also useful to separate water hydrocarbon oil emulsions.

---

The ferrofluid is a stable dispersion of finely divided magnetizable materials ranging up to about 300 A. in size dispersed in saturated cyclic and aliphatic hydrocarbons of a boiling point above about 100° C., colloidally stabilized by a water insoluble hydrocarbon oil soluble surfactant. The surfactant has initial change in interfacial tension of $-A \leqslant 10^5$ dynes/cm. per mole/liter. The surfactant is present in the ferrofluid only in quantities necessary to stabilize the colloid. This results in little free excess surfactant and the ferrofluid as a whole has an interfacial tension against water not less than about 25 dynes/cm.

The present invention relates to a ferrofluid composition adapted to removal of the oil slicks or spills from open bodies of water and for breaking hydrocarbon oil/water emulsions. For detailed discussion of the application of this ferrofluid composition to oil spills, reference is made to a copending application entitled "Process for Cleaning Up Oil Spills" filed concurrently herewith Ser. No. 46,558. For a detailed discussion of the application this ferrofluid composition to breaking hydrocarbon oil/water emulsions reference is made to a copending application entitled "Method for Separating Hydrocarbon/Water Emulsions" filed concurrently herewith Ser. No. 46,962.

Briefly, the present ferrofluid composition constitutes magnetic material which can be dispersed into the oil spill so that the oil may be removed, collected or mopped up by application of a magnetic force to the oil.

A related problem is prevention of a common oil spill, i.e. dumping of oil laden ballast water from oil tankers. The ferrofluid composition can be dispersed into the oil in the ballast, then the oil may be removed from the hydrocarbon oil/water emulsion of the ballast by application of magnetic forces before the ballast is dumped.

The object of this invention is to provide a ferrofluid composition miscible with a wide range of hydrocarbon oils yet insoluble in water. Such a composition is well adapted to magnetic separation of hydrocarbon oils from water.

The present invention is largely based on the existence of a recently discovered class of materials known as ferrofluids. Briefly stated a ferrofluid is a stable suspension of finely divided magnetic particles in a carrier fluid. The suspension or colloidal dispersion does not settle out under the influence of gravity or even of a magnetic field. Within the context of the present invention the finely divided magnetizable particles include the materials usually recognized as being magnetic such as magnetite, gamma iron oxide, metallic, iron etc. and also any material having a saturation magnetization at room temperature in excess of 1,000 gauss. This class of materials includes also cobalt, nickel, gadolinium, samarium-cobalt and similar alloys, chromium dioxide, ferrites such as manganese-zinc ferrite, manganese ferrite, nickel ferrite, and many other materials. The preferred materials for practice of the present invention are magnetite and gamma iron oxide.

The materials suspended in ferrofluids are very small with a particle size, normally less than about 300 A., and will, for example, average about 100 A. To repeat, ferrofluids are now well known in the art and are described in greater detail in numerous patents and publications. Practice of this invention requires a carefully formulated special class of ferrofluids.

The particular ferrofluids comprising the present invention are required to have certain physical attributes. Specifically they must be miscible with a wide range of petroleum oils, e.g. fuel oils, crude oils. Desirably, but not necessarily so, they should be less dense than fresh water or sea water. The ferrofluids must have a high interfacial tension against water so as not to further promote the tendency of oil and water to emulsify. They should also have a high magnetic susceptibility. Also desirable for safety reasons are such things as an absence of toxicity and a high flash point. Many of the desirable and necessary ferrofluids characteristics outline above involve properties of the carrier liquid and in consequence only a relatively small group of materials are suitable for use as the carrier liquid.

Specifically, the materials useful as carrier liquids are paraffins and naphthenes, i.e. aliphatic and cyclic saturated hydrocarbons, having a boiling point in excess of about 100° C., but not so high in molecular weight as to have a viscosity in excess of 5 centistokes at 30° C. The carrier liquids may also be described in more strictly chemical terminology as being paraffin hydrocarbons (or aliphatic) from about $C_{9-21}$ and the saturated naphthenic hydrocarbons from about $C_{7-18}$. All isomeric forms are suitable, i.e. straight chain, branched, mono-cyclic bicyclic, etc. Such materials are normally available as mixed hydrocarbons, e.g. white oil, rather than as pure compounds. Actually hydrocarbon mixtures are preferred over a pure hydrocarbon compound. The mixtures have lower pour points and a better controlled evaporation rate. Mixtures are a lot cheaper than the pure compounds.

Surprisingly, even closely related materials are not suitable and fall outside the scope of the carrier useable for the compositions of the present invention. For example the $C_{9-21}$ olefins are less stable, more water soluble, and in addition, they spread on the water more readily than do the paraffins or naphthenes. Aromatic hydrocarbons are particularly undesirable. They are more soluble in water than the corresponding saturated hydrocarbons. They are toxic to sea life, pose danger to those handling the ferrofluid. In addition, the aromatics also have lower interfacial tension against water than the corresponding saturated hydrocarbons of equal molecular weight. Chlorinated hydrocarbons are too dense, too toxic and too expensive. Still other solvent systems have been investigated for possible use as the carrier liquid e.g. ethers, esters, amines, heterocyclics, but for one reason or another have proven unsuitable. Accordingly, practice of the present invention is explicitly limited to ferrofluids wherein the carrier is selected from the above described group of paraffinic hydrocarbons, naphthenic hydrocarbons, and mixtures thereof.

However, proper selection of the carrier liquid will not in itself provide a ferrofluid with all the requisite physical attributes. Some attributes are provided by proper selection of the colloid stabilizing ingredient i.e. the surfactant, and its relative proportion in the ferrofluid.

The specific problems involved in separating hydrocarbon/water emulsions and in controlling oil spills impose certain physical requirements on the surfactant which is present in the ferrofluid to stabilize the suspension of finely divided magnetizable particles in the carrier liquid, just as they have dictated certain requirements for the carrier liquid itself. Thus, the surfactant must be hydrocarbon oil soluble and water insoluble. A solubility of less than 0.5% by weight in water constitutes a reasonable numeric criterion for what is water insolubility. In addition, the surfactant must not result in undue lowering of the interfacial tension of ferrofluid against water or of the oil-ferrofluid mixture against water. Desirably, the surfactant itself should be non-toxic.

The criteria of oil solubility and water insolublity are well known physical properties which need no explanation or discussion. However, the requirement of controlled interfacial tension so significant within the context of the present invention needs explanation, perhaps a definitive description.

The formation of an emulsion of two immiscible liquids involves the creation of a large interfacial area between the two phases. Addition of some agent which significantly lowers the interfacial tension between the two phases will promote emulsification. Surfactants, i.e. surface active agents lower the interfacial tension between oil and water, thereby facilitating formation of oil/water emulsions and stabilizing same. Many stabilizing agents suitable to formation of the stable colloidal suspension of magnetic solids (which is what a ferrofluid is) also are good oil-water emulsifying agents. Since the ferrofluid compositions of this invention are used to break hydrocarbon oil/water emulsions, addition of the ferrofluids thereto should not make the emulsion more difficult to break e.g. by further lowering interfacial tension.

The usual hydrocarbon oil/water emulsion; particularly of crude oils is due to naturally occurring surface active agents which lower the oil-water interfacial tension. For many crude petroleum products, e.g. heavy fuel oils, the oil/water interfacial tension is below 20 dynes/cm. By comparison the saturated hydrocarbons suitable as the ferrofluid carrier liquid of the present invention have oil/water interfacial tensions of about $50\pm5$ dynes/cm. Certainly any ferrofluid contemplated by this invention should have a ferrofluid/water interfacial tension higher than that of the hydrocarbon oil in the emulsion. If the interfacial tension of the ferrofluid is higher than that of the hydrocarbon oil, then the problems of emulsion stability cannot be expected to worsen when ferrofluid is added to the emulsion.

Introduction of a small amount of a surface active agent into a hydrocarbon oil will reduce the interfacial tension of the oil against water due to concentration of the surfactant at the oil/water interface. Since the continuous phase of an oil based ferrofluid is a hydrocarbon oil solution of surfactant, the ferrofluid water interfacial tension will reflect the presence of the surfactant and be a function of how much free surfactant is present in the carrier hydrocarbon oil. Fortunately many surfactants are so firmly adsorbed on the magnetic particles surfaces that the concept of free surfactant is meaningful and the ferrofluid can be treated as a hydrocarbon oil solution of surfactant.

The initial change in interfacial tension, $\gamma^1O./W.$ of a hydrocarbon oil solution of surfactant against water at a very low surfactant concentrations, decreases as a linear function of surfactant concentration, $c$. (moles/liter) in the oil. This relationship has been expressed mathematically as follows:

$$\frac{d\gamma^1O./W.}{dc}\bigg|_{c\to 0}=-A$$

Many surface active agents widely different in chemical structure have similar values of A. Since the interfacial tension characteristics of the ferrofluids are primary considerations, the surfactant suitable for the ferrofluids can be defined in terms of this characteristic as follows:

(a) The surfactant has a value for $$A \leq 10^5 \frac{\text{dynes/cm.}}{\text{moles/liter}}$$

(b) The ferrofluid as a whole has an interfacial tension against water not less than about 25 dynes/cm.

Looking further at the question of interfacial tension, it is noteworthy that while introduction of small amounts of surfactant materially affect the oil/water interfacial tension, there is little or no effect on the oil/air interfacial tension. As a result, the spreading behavior of the ferrofluid on water may be taken as a reasonable measure of the ferrofluid/water interfacial tension.

When a given volume of an oil is placed on the surface of water, which is a denser immiscible liquid so that it is initially present in a layer of appreciable thickness, several possibilities exist as to what may happen next. These phenomena are best treated in terms of the "spreading coefficient," a concept originally proposed by Harkins.[1] By definition, $$SO/W = \gamma w - \gamma O - \gamma OW$$

where

SO/W = spreading coefficient of the oil on water, dynes/cm.
$\gamma W$ = surface tension of water against dry air, dynes/cm.
$\gamma O$ = surface tension of the oil against air, dynes/cm.
$\gamma OW$ = interfacial tension of the oil against water, dynes/cm.

A positive value of SO/W indicated that spreading of the oil on water is accompanied by a decrease in free energy of the system, so that the oil will spread spontaneously on the water surface until it is present as a thin film of molecular dimensions. Conversely, a negative value of SO/W indicates that the spreading of the oil on water would be accompanied by an increase in free energy. Therefore, the oil will not spread on the water but remain as a stable lens, its equilibrium configuration being dictated by the boundary tensions, the gravitational potential energy of elements of volume and the pressure differences across the curved surface. The carrier liquids employed in this invention have a zero or negative spreading coefficient against distilled water at ambient temperature.

A similar definition of the spreading coefficient (S'O/W) applies for an oil containing a surface active solute which alters the oil/air ($\gamma'O$) or oil/water ($\gamma'OW$) interfacial tension.

Here, introduction of a small amount of surface active agent in the oil will have no effect on the oil/air interfacial tension so that $\gamma'O=\gamma O$. However, even small concentrations of a surface active agent which adsorb at the oil/water interface can markedly reduce the surface tension of the oil ($\gamma'O/W<\gamma O/W$) and thus, the spreading coefficient of the solution. S'O/W will be greater than that of the carrier liquid. When $|\gamma O/W-\gamma'O/W|\geq|SO/W|$ the oil solution will no longer form a stable lens, but will spread spontaneously on the aqueous substrate. Examination of the vast body of literature (see for example, Ref. 2) on the spreading characteristics and interfacial tension

---

[1] Harkins, W. D., J. Chem. Phys., 9, 552 (1941).
[2] Zisman, W. A., J. Chem. Phys., 9, 729 (1941).

measurements of oil/water systems indicate that the initial change in spreading coefficient of a hydrocarbon oil/surfactant solution on water at very low surfactant concentrations, varies as a linear function of the surfactant concentration, c (moles/liter), in the hydrocarbon oil with the composition of the hydrocarbon oil itself having little effect. This can be expressed mathematically as follows:

$$\frac{dS'O/W}{dc}\bigg|_{c\to 0} = -A$$

Since there are many surface active agents which are widely different in chemical structure, but have similar values of A, and since the spreading characteristics of the ferrofluid are of primary consideration, the surfactants which can be used in context of the present invention can be defined as having a value of $$A \leq 10^5 \frac{\text{dynes/cm.}}{\text{mole/liter}}$$

A realistic secreening test to determine whether a given surfactant meets the above requirement would be to determine the concentration of the surfactant in a non-spreading paraffin hydrocarbon oil which results in a solution that spreads on distilled water at ambient. Since the spreading coefficient of the pure oil is known, A is easily determied. A representative hydrocarbon liquid for these tests is tetradecane (SO/W=−6.4 dynes/cm.).[3] For decahydronaphthalene the value is −11 dynes/cm.

To repeat, physical characteristics like oil solubility, water insolubility and spreading coefficient are the criteria for the surfactants of the present invention. Extensive tests have indicated no adequate chemical basis for selecting those surfactants most suitable for forming ferrofluids and then picking the particular surfactants useable in the ferrofluids of the present invention. Fortunately, the surfactant art is most extensive, the literature thereon voluminous, and the surfactant compounds legion. A tremendous number of diverse materials have surface active properties and can be identified as being surfactants, e.g. fatty acids, alcohols, amines, amides, alkyl phenols, other organic acids, polyacrylates, just to name some. One possible chemical correlation indicated by tests and theoretical studies on ferrofluids is the apparent need for at least a 12 carbon atom chain in the surfactant, but this need appears related more to colloid stabilization in all ferrofluids than to the special ferrofluid requirements of this invention. To repeat again, the only basis found for inclusion or exclusion of a particular surfactant capable of forming a ferrofluid are the physical requirements of: hydrocarbon oil solubility, water insolubility and spreading coefficient. As at least a point of preferred practice, the surfactant should exhibit irreversible adsorption on the magnetic particle surface. Conceivably irreversible adsorption may be a necessary physical characteristic for surfactants suitable in practice of this invention, but not enough data is available to pose such as a certainty.

More must now be said about the spreading coefficient. The rationale underlying a numeric limitation for the spreading coefficient resides in the character of hydrocarbon/water emulsions. They may be mixtures, they may be stable emulsions, but whichever, the ferrofluid should not disperse more oil in the water or form a more stable emulsion of oil in water or water in oil. Yet the ferrofluid must come into contact and disperse in the oil so some surface activity is desired.

The rationale underlying a numeric limitation for the spreading coefficient resides also in the character of the hydrocarbons in oil slicks. Most of the petroleum oils which occur in oil spills have a spreading coefficient somewhat in excess of 20 dynes/cm., usually in the range of 25–45 dynes per centimeter.[4]

[3] Gillap, W. R., Weiner, N. D., and Gibaldi. J. Am. Oil Chemist Soc., 44, 71 (1967).
[4] Garrett, W. D. and Berger, W. R., Environmental Science & Technology, Vol. 4, No. 2, 124 (Feb. 1970).

Natural petroleum products contain significant but variable amounts of sulfur, oxygen or nitrogen containing compounds that are surface active and tend to promote the spreading of an oil slick once it's formed. The extent of the spreading is a function of the quantity and nature of the surface active components of the oil. It should be pointed out that the properties and history of the oil slick determine its spreading characteristics much more than whether the aqueous substrate be sea water or fresh water a difference which would result in variations of spreading coefficient of less than 1–2 dynes/cm. Addition to the oil slick of a ferrofluid containing a surfactant with as high or a higher spreading coefficient than the existing slick would serve only to spread the slick further and make cleaning up the slick that much more difficult. Yet the ferrofluid must disperse in the oil. The ferrofluid can disperse in the oil either as a result of normal diffusion processes which are slow, the natural mixing action of waves or by spreading at the oil slick water interface. Therefore, here too some surface activity is desired.

It follows then that part of the physical criteria for the ferrofluid, one relating to the surfactant, is a substantial and real limitation on its content. The ferrofluid of the present invention contains a carefully controlled minimum proportion of surfactant. In practical terms this is a lower proportion of surfactant than usually is present in ferrofluids.

Here too, elaboration may be required. A ferrofluid is a colloidal dispersion of magnetic particles in a carrier liquid stabilized by the surfactant. The surfactant and the magnetic particles can be considered as joined, even reacted. However the system is dynamic with some of the surfactant in free solution, some firmly attached, some loosely attached and at all times partitioning between adsorption at the surface of the magnetic particles and free solution in the carrier. (The surfactant in free solution is available for surface action at the oil-water interface when the ferrofluid is in contact with water.) In formulating the usual ferrofluid the primary concern is achievement of colloid stability; and substantial excess of surfactant is included as a matter of course. Here, an almost equal concern exists about avoiding presence of excess surfactant. Only enough surfactant is present for colloid stability.

If the surfactant exhibits irreversible adsorption on the surface of the magnetic particles then the total surfactant content in the ferrofluid may approximate the bound up surfactant without need for enough surfactant to counter also dilution factors i.e. the effect of adding ferrofluid to an oil/water emulsion, and to counter the effect of an oil-water interface.

The spreading coefficient alluded to above can be employed as a test on the ferrofluid (against distilled water at ambient) to determine surfactant suitability. Here the spreading coefficient should not exceed about 20 dynes per centimeter.

The spreading coefficient of a candidate ferrofluid surfactant may be obtained by direct measurement of the surface tension and the interfacial tension against water of the ferrofluid by standard analytical methods (which, however, are time consuming and require great skill). A simple screening test which accomplishes the same goals is to dilute a ferrofluid with a given volume of a non-spreading hydrocarbon solvent and determining whether a drop of the resulting mixture spreads on distilled water. If it is assumed that S O/W–S′ O/W is proportional to the free surfactant concentrations, the ratio of ferrofluid to diluent solvent is determined by the limit of 20 dynes/cm. chosen for the ferrofluid and the spreading coefficient of the pure diluent hydrocarbon solvent. With tetradecane as the test liquid, a drop of a mixture of 1 volume of the candidate ferrofluid with 3 volumes of pure tetradecane should not spread on distilled water at ambient temperature in order for this ferrofluid to meet the requirements of the present invention.

As a proviso, it may be noted that the ferrofluid usually contains far more than a negligible concentration of surfactant in the carrier liquid, but that substantially all of the surfactant is bound to the magnetic particles. In effect the spreading coefficient test shows that virtually no free surfactant is present in the ferrofluid (typically less than $10^{-2}$ moles/liter).

Although only the above-identified physical characteristic for the surfactant in ferrofluids are crucial preferred surfactants for practice of this invention can be identified in chemical terms. They are carboxylic acids $C_{12}$ and higher, saturated or unsaturated, natural or synthetic in origin, including for example, oleic acid. The carboxylic acids may even be very high molecular weight carboxylic acids (such as for example the polyisobutene acids disclosed in British Pat. 1,075,121). The preferred suitability of the $C_{12+}$ carboxylic acids as a class with no upper limit further illustrates the extent to which the surfactant cannot be defined in chemical terminology. The true upper limit for the number of carbon atoms in the carboxylic acid chain is again a physical parameter, i.e. the oil insolubility of very high level molecular weight carboxylic acids. Also preferred are the $C_{12}$ and higher fatty alcohols and alcohol esters. Further identification of preferred surfactants does not appear warranted in light of the tremendous extent of the literature on oil soluble, water insoluble surfactants and on the virtually infinite number of surfactants which can be made.

Some discussion is required about the proportion of magnetic particles in the ferrofluid. Obviously as much as possible is best, but the upper limit for a realistic ferrofluid is set by the specific gravity of the ferrofluid. Ferrofluid formed in the paraffins and naphthenic hydrocarbons described above can be formulated with specific gravity far in excess of that of sea water, e.g. specific gravity 1.5, particle content about 15% by volume. Certainly, in terms of shipping, the highest possible concentration of magnetic particles might be advantageous, but as a practical matter a density limit of sea water and of fresh water exists for marine and fresh water application respectively. For emulsion breaking purposes the ferrofluid and hydrocarbon oil/phase should have similar densities to facilitate mixing of the two oil phases. Thus with oils less dense than water, the ferrofluid should be less dense than water so that the water phase will not be a physical barrier to mixing. The reverse is true with the few oils denser than water. Numeric concentration ranges in terms of percent by volume of magnetic particles per part of carrier will depend on the individual carrier liquid and therefore even the preferred range is imprecise, almost arbitrary. Generally the concentration of magnetic particles in the carrier should be from about 3% to 10% by volume. The actual upper limit for specific gravity i.e. a density just below 1 gr./cm. or 1.03 gr./cm.$^3$, will depend upon the density of the carrier, the density of the surfactant and the density of the magnetic material. Although to repeat, ferrofluids containing as much as 20% by volume of magnetizable material have been made in these hydrocarbon carriers and 40% content is believed theroretically possible. In passing it is noted that high particle content ferrofluids tend to be relatively viscous. However viscosity considerations have not been found to be material with the relatively low particle content ferrofluids consistent with a specific gravity of about 1.

For logistic and economic reasons it is manifestly desirable to add as little ferrofluid as reasonably possible to a particular oil/water emulsion or oil slick. The minimum quantity of ferrofluid necessary to achieve significant results can be just enough to provide about 0.01% by volume of magnetic particles in the final mixture of oil and ferrofluid. Such a small concentration does require powerful magnetic forces. As a practical matter, if the expense of adding ferrofluid to an oil/water emulsion or to an oil slick is justified by the circumstance then enough should be added for facile separation through magnetic forces. Preferred is a particle content of about 0.5% by volume. The general range of magnetic particles in the oil/ferrofluid mixture contemplated for preferred practice of the present invention is 0.5 to 3.0% by volume of magnetic particles in the final mixture. In some instances a concentration of up to about 4.0% may be employed.

The minimum concentration of magnetic particles in the oil of 0.01% by volume is predicated upon the consideration of how little magnetic material may be persent to counteract certain pressures or forces which normally exist in an oil slick or in an oil/water emulsion by the magnetic forces which are capable of being applied thereto.

The ferrofluids compositions are as above described advantageous for emulsion breaking, particularly with regard to ballast water. They are essentially insoluble in water, soluble in oil. They may be added to ballast water by being pumped into the empty tank or, better yet, sprayed directly into the empty tank on top of whatever oil phase may be present therein. The ferrofluid diffuses quite rapidly into the oil phase particularly if a water-in-oil emulsion is involved. In the instance of an oil in water emulsion, agitation may be required to mix the ferrofluid into the dispersed oil globules, e.g. mixers, or even pumping the water from one tank to another. Fortunately, in the instance of oil tankers the mechanics of that situation usually permits a facile incorporation of ferrofluid into the oil. There the oil/water emulsions usually results from addition of relatively clean ballast water to oil contaminated tanks. Addition of the ferrofluid to the tanks just prior to ballasting with water will cause the ferrofluid to disperse in the residual oil therein before any oil in water emulsions form.

Complete dispersion of the ferrofluid converts the oil phase into a more dilute ferrofluid with magnetic particles in stable colloidal dispersion therein. If the oil/water emulsion is then passed through a strong magnetic field the oil will be affected but not the water. In effect the oil will be dragged out of the water phase, the water will be squeezed out of the oil phase.

The instance of treating an oil slick mixing low viscosity ferrofluids with the oil spill presents no great difficulty. The carrier hydrocarbons are miscible with the oil spill hydrocarbons. After all, an oil spill floating on a body of water is relatively thin, never exceeding more than a couple of inches in depth even for a fresh spill, normally less than a centimeter, and ultimately in a weathered spill as little as a millimeter in depth. Therefore the free flowing ferrofluid sprayed or otherwise applied on the surface of an oil spill, will readily penetrate into the oil slick and in a quite short period of time, certainly within a couple of hours will disperse itself sufficiently to transform the oil slick as a whole into a magnetizable mass, i.e., into a more dilute ferrofluid. The agitation which occurs through wind and wave action will actually enhance dispersion of the ferrofluid throughout the oil slick and make the oil slick susceptible of control through magnetic forces. It may be emphasized now that the present ferrofluids do not present pollution hazards. All material added to an emulsion or to oil slick is removed with the oil phase on the oil slick. Even if the oil is burned, after recovery, the ferrofluid burns too leaving the magnetic particles behind as ash and not much of that either, i.e. less than about 3.0% by volume, whatever had been added.

Any ferrofluid left in the water does not constitute a serious pollutant. The carrier is volatile enought to evaporate in time. Biodegradable surfactants e.g. oleic acid can be employed. The magnetic particles are the only true residue and these will form an insignificant (non-toxis) inorganic addition to the silt on the ocean, lake or river bottom.

For further understanding of this invention the following specific examples are hereinbelow presented.

EXAMPLE I

A series of ferrofluids were formed by ball milling finely divided magnetite, carrier liquid and stabilizing agent (surfactant). Details of the individual ferrofluids are tabulated below

TABLE I

| | Overall composition, volume | | | Principal physical properties | | | |
|---|---|---|---|---|---|---|---|
| | | | | Den-sity, gm./cm.$^3$ (25° C.) | Kine-matic vis-cosity cs., 30° C. | Magnetic properties | |
| Run | Magnetite size | Stabilizing agent, percent | Carrier liquid, percent | | | Initial suscep-tibility | Satur-ation magneti-zation, gauss |
| 1-1a (1102) | 88 A., 1.4% | PIBSA, 5.3 | Kerosene, 93 | .844 | 4.1 | 0.10 | 43 |
| 1-1b (1103) | 88 A., 2.6% | PIBSA, 9.9 | Kerosene, 87 | .878 | 6.0 | 0.19 | 80 |
| 1-1c (1104) | 88 A., 5.7% | PIBSA, 27.1 | Kerosene, 73 | 1.01 | 53 | 0.40 | 172 |
| 1-2 (1105) | 6.7%, 84 A | PIBSA, 17.1 | Methyl cyclohexane, 75 | 1.096 | 54 | 0.47 | 195 |
| 1-3 (1106) | 5.0%, 84 A | PIBSA, 12.8 | Decahydronaphthalene, 82 | 1.068 | 32 | 0.35 | 150 |
| 1-4 (1107) | 4.6%, 84 A | PIBSA, 11.7 | Tetradecane, 84 | 0.962 | 32 | 0.32 | 138 |
| 1-5 (1108) | 85 A., 3.0% | PIBA, 7.5 | Kerosene, 90 | 0.915 | 6.8 | 0.18 | 80 |
| 1-6 (1109) | 80 A., 4.8% | Oleic acid, 11.0 | Tetradecane, 84 | 0.965 | 3.6 | 0.17 | 131 |
| 1-7 (1110) | 70 A., 1.1% | Dodecyl amine, 2.0 | Decahydronaphthalene, 97 | 0.897 | 5.6 | .03 | 28 |
| 1-8 (1111) | 84 A., 3.4% | PIBSA, 8.6 | Kerosene, 88 | 0.972 | 5.1 | 0.24 | 100 |

TABLE II.—PROPERTIES OF STABILIZING AGENTS USED TO PREPARE TEST FERROFLUIDS

| | Oleic (purified) | Polyiso-butene (PIBA) | Polyiso-butene succinic acid (PIBSA) | Dodecyl amine (D.A.) |
|---|---|---|---|---|
| Source— | Fisher Scientific Co. | Enjay Chemical Co. | Enjay Chemical Co. | Fisher Scientific Co. |
| Molecular weight | 282 | [1] 1,000 | [1] 1,000 | 185 |
| Acid Number (ASTM D-664) (where applicable) | 19.8 | 30-45 | 105-20 | N.A. |

[1] Peak.

TABLE III.—DESCRIPTION & PROPERTIES OF CARRIER LIQUIDS USED TO PREPARE TEST FERROFLUIDS

| | Refined kerosene | n-Tetra-decane | Methyl cyclo-hexane | Decahydro-naphtha-lene |
|---|---|---|---|---|
| Source— | Humble Oil and Refining | Eastman Kodak | Fisher Scientific Co. | Fisher Scientific Co. |
| Category | Mixed paraffins | Paraffin | Monocyclic branched naphthene | Bicyclic naphthene |
| Density (25° C.), gr./cm.$^3$ | 0.786 | 0.759 | 0.765 | 0.877 |
| Viscosity (30° C.), cs | 1.9 | 2.3 | 1.1 | 2.1 |
| Boiling Point, °C | 205-254 | 254 | 100 | 187-195 |
| Spreading coefficient (of sample on distilled water at room temperature) | S<0 | S<0 | S<0 | S<0 |

With all the ferrofluids described in Table 1, the drop did not spread on distilled water, passing the spreading test, and indicating thereby the presence of very little free surface active material in solution. Essentially all of the surfactant added to stabilize the colloidal suspension is adsorbed on the surface of the magnetite particles and not free to interact at the oil/water interface. Ferrofluid 1109 (Ex. 1-6) contains 11% oleic acid by volume, equivalent to a concentration of 0.35 moles/liter of solution, yet passing the spreading test indicates a concentration of free oleic acid less than 0.01 moles/liter, and probably far less.

To demonstrate that the proportion of carrier may be varied greatly, without affecting ferrofluid stability, ferrofluids 1102 and 1103 were obtained from ferrofluid 1101 by vacuum distillation removal of carrier liquid.

In another instance, a ferrofluid originally formulated with a substantial excess of surfactant was adjusted down in spreading coefficient to the 20 dynes/cm. level by contacting the ferrofluid with activated charcoal. (This ferrofluid later became ferrofluid 1109.)

The above ferrofluids were, of course formulated so that all exhibited a spreading coefficient less than 20 dynes/cm. against distilled water at room temperature. However determination of whether a candidate ferrofluid meets this criterion can be done by the relatively simple pass-fail test outlined below.

An aliquot of ferrofluid is dissolved in a non-spreading oil of known negative spreading coefficient using a dilution ratio which depends on the coefficient of the oil (20/So where So is the spreading coefficient of the oil). In tests on the above ferrofluids one volume of ferrofluid was diluted with 12.5 volumes of mixed cis and trans decahydronaphthalene (Fisher Scientific Co.) which measured a spreading coefficient of −1.4 dynes/cm. against distilled water [by ASTM method D-1331 (1965)].

A drop of the mixture is placed on water surface in a glass vessel that was carefully cleaned in chromic acid and rinsed with distilled water. If the drop does not spread, the original ferrofluid has a sufficiently low spreading coefficient for the present purposes. If this drop spreads, the spreeading coefficient of the ferrofluid is in excess of 20 dynes/cm. and the ferrofluid falls outside the scope of this invention.

EXAMPLE II

Ferrofluids available from other ferrofluid work were tested by the above described spreading coefficient test to determine suitability. None passed, except Ferrofluid 1111. These ferrofluids are described in Table IV.

TABLE IV.—FERROFLUIDS NOT APPLICABLE

| | Examples | | |
|---|---|---|---|
| | 2-1(1112) | 2-2(1088) | 2-3(1059) |
| Magnetite: size, concentration.[1] | 88 A., 12.2 | 87 A., 3.6 | 80 A., 2.0. |
| Stabilizing agent concentration.[1] | PBISA, 46.5 | Tenlo 70, 8.7 | Oleic acid, 7.0. |
| Carrier, concentration[1] | Kerosene, 40 | Kerosene, 88 | Kerosene, 91. |
| Density, g.m./cm.$^3$ (25° C.) | 1.27 | 0.894 | 0.875. |
| Kinematic visosity (30° C.), cs. | 6800 | 2.5 | 1.7. |
| Initial susceptibility | 0.78 | 0.27 | 0.07. |
| Saturation magnetization, gauss. | 368 | 108 | 55. |
| Spreading coefficient reading against distilled water. | Passes test | Does not pass test. | Does not pass test. |
| Average particle diameter, angstroms. | 88 | 87 | 80. |

[1] Volume percent.

Ferrofluid 1059 differs from ferrofluid 1109 principally in the concentration of free oleic acid. Percolation of ferrofluid 1059 through a column filled with activated charcoal granules removed virtually all of the free oleic acid and the ferrofluid was then employed to prepare 1109.

Ferrofluid 1088 shows that the surfactant must be firmly attached to the magnetic particle surfaces; reversible adsorption is not desirable. The surfactant used in this instance, Tenlo-70 is described by the manufacturer (Diamond Shamrock Corp.) as an oil soluble, non-ionic, condensation product of an amino ester of a fatty acid. With this surfactant (and a kerosene carrier) a substantial free surfactant content has been required to maintain a stable dispersion of colloidal magnetite.

Aside from failing the spreading coefficient test, ferrofluid 1088 exhibited a related disability. Specifically substantial dilution induced flocculation of the magnetite particles. In terms of emulsion treatment considerable dilution of the ferrofluid (in the oil) is contemplated and the ferrofluid should be dilutable to almost any degree without flocculating.

Ferrofluid 1112 is included to demonstrate that the particle content can be increased to what is an essentially non-usable level as a practical matter without destroying colloid stability or upsetting the spreading coefficient test. Ferrofluid 1112 was prepared by vacuum evaporation of the carrier liquid from ferrofluid 1102.

EXAMPLE III

This example shows that this invention is limited to ferrofluids i.e. stable colloidal dispersions of magnetic particles, of an extremely small size range distribution i.e. less than about 300 A.

A commercial grade of magnetite powder (MO 4332—Minerals Pigmens and Metals Division of Charles Pfizer & Co.) was dispersed in a solution of oleic acid and decahydronaphthalene in the following volume fraction proportions.

Magnetite ———————————————————— 0.030
Oleic acid ———————————————————— 0.004
Decahydronaphthalene —————————————0.966

The specific area of the magnetite particles is 12.5 m.$^2$/gm. a much lower value than the 75 m.$^2$/gm., of particles present in ferrofluids. The above oleic acid concentration corresponds to about a monolayer of oleic acid on the particle surfaces.

A 50 cc. sample of the above mixture in a test tube shaken for 1 hour at 280 cycles/min. in a reciprocating shaker then an aliquot of the (black) suspension was removed from the tube and one drop placed on a distilled water surface (in a Petri dish). The drop did not spread. Additional suspension to a total of about 0.5 cc. was added. The suspension formed a floating black lenticular drop with the magnetite remaining in the oil phase. Thereafter a hand magnet (gap field 2000 oe.) was brought close to the suspension which caused agglomeration of the magnetite and attraction to the magnet, leaving behind a clean lens of oil floating on the water. Only a small fraction of the oil was removed with the magnetic particles by the magnet.

EXAMPLE IV

This example shows that essentially all of a ferrofluid can be removed magnetically from a wide range of aqueous substrates.

A series of tests were run each with a tared 14 cm. diameter Petri dish filled with water and weighed on a balance sensitive to 0.1 gm. to ascertain the weight of water. A small quantity of ferrofluid was dropped on the water surface and its weight determined. After about 2 minutes the diameter of the ferrofluid slick was estimated, allowing also the thickness of the slick to be estimated.

Thereafter a C shaped hand magnet-gap field 4300 oe., gap volume 1.5 cm.$^3$ (gap width 0.76 cm., length 0.63 cm., depth 3.1 cm.) was brought down close to the surface of the slick, which attracted the ferrofluid slick and caused its removal from the water. The change in gross weight of the Petri dish was then determined.

The ferrofluids tested were ferrofluids 1102, 1104, 1105, and 1108. The aqueous substrates employed were distilled water, Lowell (Mass.) tap water, and standard buffer solutions pH 6, pH 7, pH 8, of 0.05 molar solutions monosodium phosphate and sodium hydroxide (Fisher Scientific Co.). Sea water was unavailable at the time these tests were run.

In all tests essentially all of the ferrofluid was removed by bringing the magnet just above the liquid surface, even though the ferrofluid slick was quite thin (1 mm. and as little as 0.1 mm.). The quantity of material removed by the magnet exceeded the weight of ferrofluid added, due to inclusion of some water with the ferrofluid taken up by the magnet. Removal of ferrofluid was almost complete. Left behind in all instances, was only a transparent brownish film (more or less discontinuous). The thickness of the residual film was estimated as not more than a few microns.

All told the behavior of the ferrofluid, magnetic pick up of the ferrofluid and the quantity of unrecoverable residue did not differ materially with any of the aqueous substrates nor with the different ferrofluids.

EXAMPLE V

This example shows that very dilute ferrofluids can be controlled by application of magnetic forces and that ferrofluids can be diluted to a very great extent without affecting colloid stability.

The equipment employed included a 14 cm. Petri dish and an electromagnet with a .5 inch gap. The magnetic field along the horizontal line bisecting the gap was known as a function of the applied current and distance from the center of the magnet. The Petri dish was filled with water (distilled) and placed next to the pole pieces of the magnet so that the water level was in the same horizontal plane as the center of the magnet.

In consequence, a drop of ferrofluid placed on the water surface along the center line bisecting the gap would be subjected to a uniaxial magnetic force (of known magnitude) tending to pull the drop toward the magnet.

The actual magnetic force $F_m$ acting on a drop at a distance $X_1$ from the magnet is:

$$F_m = v \int_{H_1}^{H_2} M dH$$

where $v$ is the volume of the drop.

TABLE V.—HORIZONTAL MOTION OF A DILUTE FERROFLUID AS A FUNCTION OF APPLIED FIELD

| Ferrofluid [1] | Magnetite concentration volume fractions | Ferrofluid saturation magnetization, gauss | Applied current, amps | Initial distance of drop from center of magnet-X | Magnetic field H at X, oersted | Horizontal magnetic field gradient, oe./cm. | Fluid magnetization M in a field H, gauss | Magnetic forces on drop dynes | 0.025 cm.$^3$ drop moves toward magnet |
|---|---|---|---|---|---|---|---|---|---|
| 1102-A | 6.4 × 10$^{-4}$ | 1.84 | 7.5 | 7.75 | 116 | 19 | 0.40 | 1.5 × 10$^{-2}$ | No. |
| 1102-A | 6.4 × 10$^{-4}$ | 1.84 | 4.0 | 7.00 | 80 | 26 | 0.30 | 1.5 × 10$^{-2}$ | No. |
| 1102-A | 6.4 × 10$^{-4}$ | 1.84 | 2.5 | 5.50 | 92 | 16 | 0.35 | 1.1 × 10$^{-2}$ | No. |
| 1102-A | 6.4 × 10$^{-4}$ | 1.84 | 5.0 | 5.50 | 185 | 32 | 0.55 | 3.5 × 10$^{-1}$ | Yes. |
| 1102-A | 6.4 × 10$^{-4}$ | 1.84 | 1.0 | 3.25 | 140 | 78 | 0.51 | 8.0 × 10$^{-1}$ | Yes. |
| 1102-B | 7.2 × 10$^{-5}$ | 0.21 | 30.0 | 7.75 | 430 | 57 | 0.92 | 1.1 × 10$^{-2}$ | No. |
| 1102-C | 1.4 × 10$^{-6}$ | 4.1 × 10$^{-2}$ | 50.0 | 7.75 | 550 | 75 | 0.021 | 3.2 × 10$^{-3}$ | No. |
| 1102-C | 1.4 × 10$^{-5}$ | 4.1 × 10$^{-2}$ | 50.0 | 4.00 | 2,900 | 790 | 0.033 | 5.2 × 10$^{-1}$ | Yes. |

[1] Ferrofluid 1102 diluted with tetradecane; volume concentration magnetite in Ferrofluid 1102=0.015; saturation magnetization Ferrofluid 1102=43 gauss.

where:

$H_1$ = Field at $X+D/2$
$H_2$ = Field at $X-D/2$
M = Field magnetization at a field H As a first approximation (where $X_1 = X$) the above equation is equal to $$F_m = v\left(M \frac{dH}{dX}\right)$$

By keeping the drop volume constant (0.025 ml. during these tests) the magnetic force on a drop of given ferrofluid becomes solely a function of the local field, and that in turn is an already known function of the current applied to this electromagnet and the distance of the drop center from the magnet.

Since the resistance to initial motion would be due principally to adhesion of the drop of water (interfacial forces) and to inertial forces test results on diluted ferrofluids would show first whether the drop is still a ferrofluid (i.e. uniformly magnetic). Any substantial particle segregation in the drop of fluid would affect the behavior of the drop. In addition this test shows the extent of dilution possible before magnetic susceptibility decreases to the point of no magnetic response.

By systematically diluting an aliquot of ferrofluid 1102 with tetradecane, ferrofluids of decreasing magnetic concentration were obtained. The magnetite concentrations and magnetic properties were calculated from the dilution ratios. For this series of tests a drop volume of 0.02 ml. was employed, and each drop formed a lens on the water surface with a diameter (D) of about 0.5 cm. The experimental results are summarized in Table V.

The below tabulated results demonstrate that extremely dilute ferrofluids are magnetically attracted. Ferrofluid 1102 C is $10^4$ times more dilute than the parent ferrofluid 1102.

A significant finding was then even the most dilute ferrofluids were stable. The drops moved toward the magnet in a manner consistent with uniform dispersion therein. of the magnetite and with visual evidence of particle segregation or agglomeration.

A second set of tests were run with the same equipment. In each test a drop of oil (non-magnetic) was placed 7¾" from the magnet, and the magnet drew 50 amps. At this point the magnetic field (H) was 550 oe. while thre local horizontal field gradient was 75 oe./cm.

In the first test a 0.025 ml. drop of tetradecane was placed on the water. It did not move. Then an equal sized drop of ferrofluid 1102 A was added to the sessile drop of tetradecane. The large drop of combined liquid immediately moved as whole toward the magnet.

In a second like test about 0.5 ml. of No. 6 oil was carefully placed on the surface of a water sample (which previously had been in contact with the oil). The sample did not spread, forming instead a sessile drop about 1.5 cm. in diameter. The magnetic field had no effect on this drop (nor had it any affect on the tetradecane). A 0.025 ml. drop of ferrofluid 1102 was added to the No. 6 fuel oil drop. The combined drop immediately started moving as a body toward the magnet.

EXAMPLE VI

In a set of test runs 5 gms. of water, 2 gms. of oil were placed in each of two 15 ml. graduated centrifuge tubes. About 2 gms. of methyl cyclohexane based ferrofluid (ferrofluid 1105 density 1.069, viscosity at 30° C. 54 cps., magnetization at 10,000 oe. of 173 gauss,) was added to one tube, an equal quantity of methyl cyclohexane above to the second tube. All the tubes were shaken mechanically for 20 minutes and the degree of emulsification noted. Tube 1 was placed in a strong magnetic field gradient of about 4 koe./cm., (field was about 12 koe.) for 15 minutes and the magnetically squeezed out water removed with a pipete and weighed. The same tube was then centrifuged for 15 minutes to about 1700 g. and the additional quantity of recovered water measured. The second tube was centrifuged and the quantity of water recovered was determined.

The characteristics of the oils used are given in Table VI, the test results in Table VII and the control results in Table VIII.

TABLE VI.—OILS USED FOR EMULSIFICATION STUDY

| Oil | Density, gr./ml. at 25° C. | Viscosity, cps. at 30° C. |
| --- | --- | --- |
| No. 6 fuel oil, Texaco | 0.96 | 2,000 |
| No. 2 fuel oil, Texaco | 0.86 | 3 |
| Texaco 20-20-W detergent motor oil | 0.88 | 100 |
| Methylcyclohexane | 0.77 | 1.4 |

TABLE VII.—MAGNETIC EMULSION BREAKING EXPERIMENTS

| Test | Oil used | Water recovered magnetically, percent water added | Water recovered by subsequent centrifuging, percent | Percent water not recovered | Emulsion formed |
| --- | --- | --- | --- | --- | --- |
| 1 | No. 6 | 73 | 2 | 25 | Moderate. |
| 2 | No. 2 | 97 | 3 | None | Slight. |
| 3 | 20-20-W | 106 | 4 | -10 | Heavy. |
| 4 | No. 6 | 34 | 12 | 54 | Do. |

TABLE VIII.—CONTROL EMULSION BREAKING EXPERIMENTS

| | | Centrifuge at 1,700 g. | |
| --- | --- | --- | --- |
| Test | Oil and solvent oil used | Water recovered by centrifuge, percent of water added | Emulsion formed |
| 1 | No. 6 | (¹) | Moderate. |
| 2 | No. 2 | 100 | Slight. |
| 3 | 20-20-W | 110 | Heavy. |
| 4 | No. 6 | 104 | Moderate. |

¹Tube broken, sample lost.

Tests 1 and 4 were run on the same #6 fuel oil. As a whole the tests indicate that for refined petroleum products e.g. lube oil and No. 2 fuel oil recovery in a substantially water free state by magnetic techniques may be expected. High speed centrifuging (1700 g.) could remove little more water either on the control or on the test subsequent to magnetic removal. The tests on No. 6 fuel oil indicate that the recovered oil may be loaded with water, but that a substantial degree of oil removal can be attained magnetically even from viscous oils.

What is claimed is:

1. A ferrofluid consisting essentially of a stable dispersion of magnetic particles less than about 300 A. in size in a carrier hydrocarbon oil selected from the group consisting of $C_{9-21}$ aliphatic hydrocarbons and the saturated $C_{7-18}$ naphthenic hydrocarbons and mixtures thereof, stabilized by a water insoluble, hydrocarbon soluble surfactant present on the surface of the magnetic particle and in solution that the ferrofluid as a whole has a spreading coefficient less than about 20 dynes/cm., measured at ambient and with distilled water.

2. A composition as in claim 1 wherein the surfactant itself has an interfacial tension against water not less than about 25 dynes/cm.

3. A composition as in claim 1 wherein the surfactant is an oil soluble, water insoluble carboxylic acid having at least 12 carbon atoms.

4. A composition as in claim 1 wherein the surfactant is oleic acid.

5. A composition as in claim 1 wherein the surfactant is a high molecular weight polyisobutene carboxylic acid.

6. A composition as in claim 1 wherein the particles are magnetite and the magnetite concentration is in excess of 0.01% by volume.

7. A composition as in claim 1 wherein the particles are gamma iron oxide and the oxide concentration is in excess of 0.01% by volume.

References Cited

UNITED STATES PATENTS 2,106,882   2/1938   Betz _____ 252—62.56
3,531,413   9/1970   Rosensweig _____ 252—62.56

OTHER REFERENCES

Rosensweig—Magnetic Fluids—International Science and Technology, July 1966, pp. 48–49.

ROBERT D. EDMONDS, Primary Examiner

U.S. Cl. X.R.

252—62.51